United States Patent
Sonoda et al.

(10) Patent No.: US 10,473,821 B2
(45) Date of Patent: Nov. 12, 2019

(54) OPTICAL MEMBER AND ITS PRODUCTION METHOD

(71) Applicant: FUJIFILM Corporation, Tokyo (JP)

(72) Inventors: Shinichiro Sonoda, Ashigarakami-gun (JP); Tatsuya Yoshihiro, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 840 days.

(21) Appl. No.: 14/850,310

(22) Filed: Sep. 10, 2015

(65) Prior Publication Data

US 2015/0378058 A1  Dec. 31, 2015

Related U.S. Application Data

(63) Continuation of application No. PCT/JP2014/000812, filed on Feb. 18, 2014.

(30) Foreign Application Priority Data

Mar. 15, 2013 (JP) ................. 2013-052646

(51) Int. Cl.
  *G02B 1/11* (2015.01)
  *C03C 17/34* (2006.01)
  (Continued)

(52) U.S. Cl.
  CPC ............ *G02B 1/11* (2013.01); *C03C 17/34* (2013.01); *G02B 1/113* (2013.01); *G02B 1/118* (2013.01);
  (Continued)

(58) Field of Classification Search
  CPC ........ G02B 5/02; G02B 5/0205; G02B 5/021; G02B 5/0215; G02B 5/0221;
  (Continued)

(56) References Cited

U.S. PATENT DOCUMENTS

2009/0022954 A1   1/2009  Kotani et al.
2012/0050871 A1*  3/2012  Sakai .............. G02B 1/105
                                          359/601

FOREIGN PATENT DOCUMENTS

JP    11-64607 A      3/1999
JP    2005-275372 A   10/2005
JP    2012-73590 A    4/2012

OTHER PUBLICATIONS

Japanese Notification of Reasons for Refusal for Japanese Application No. 2013-052646, dated May 6, 2016, and an English Translation thereof.

(Continued)

*Primary Examiner* — Robert E. Tallman
(74) *Attorney, Agent, or Firm* — Birch, Stewart, Kolasch & Birch, LLP

(57) ABSTRACT

A first light-shied-coating formation step that forms a light shield coating only in a part of an area of a transparent-substrate in which a light shield coating is to be formed, a step that deposits an optical thin film including, as its outermost layer, a layer to be hydrothermally treated, which will become a fine uneven pattern coating by being hydrothermally treated, in an area in which an antireflection coating is to be formed, a second light-shield-coating formation step that forms a light shield coating in all of the area in which the light shield coating is to be formed, but the light shield coating was not formed in the first light-shield-coating formation step, and a step that forms the fine uneven pattern coating in the area in which the antireflection coating is to be formed by hydrothermally treating the layer to be hydrothermally treated are performed in this order.

12 Claims, 4 Drawing Sheets

(51) Int. Cl.
  *G02B 1/12*    (2006.01)
  *G02B 5/02*    (2006.01)
  *G02B 1/113*   (2015.01)
  *G02B 1/118*   (2015.01)
(52) U.S. Cl.
  CPC ............ *G02B 1/12* (2013.01); *G02B 5/0294* (2013.01); *C03C 2217/73* (2013.01)
(58) Field of Classification Search
  CPC .. G02B 5/0231; G02B 5/0273; G02B 5/0294; G02B 5/20; G02B 5/201
  USPC ............................ 359/359, 488.01, 601, 614
  See application file for complete search history.

(56) References Cited

OTHER PUBLICATIONS

International Search Report, issued in PCT/JP2014/000812, dated May 13, 2014.
Written Opinion of the International Searching Authority, issued in PCT/JP2014/000812, dated May 13, 2014.
Yamada et al., "Effects of temperature on formation and corrosion resistance of boehmite films—Studies on boehmite forming process (6th report)-", The Journal of Japan Institute of Light Metals,1971, vol. 21, No. 9, pp. 597-605.

\* cited by examiner

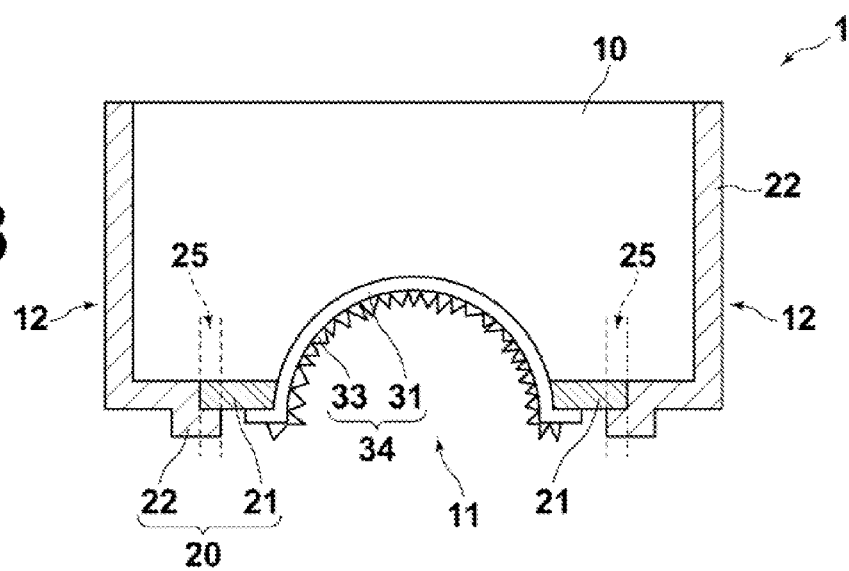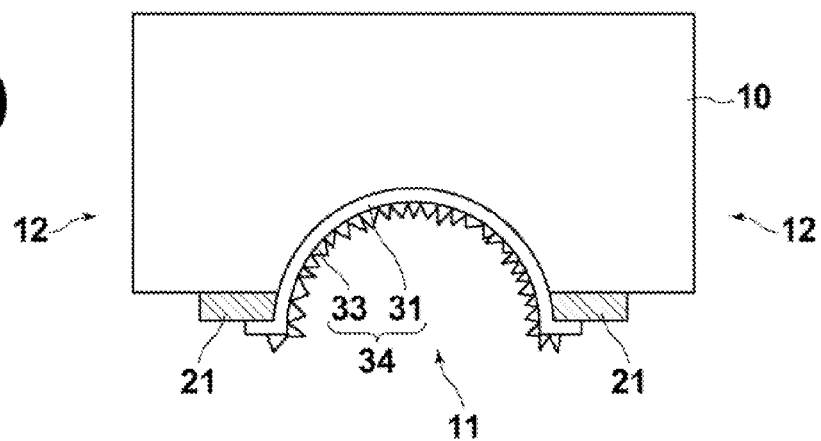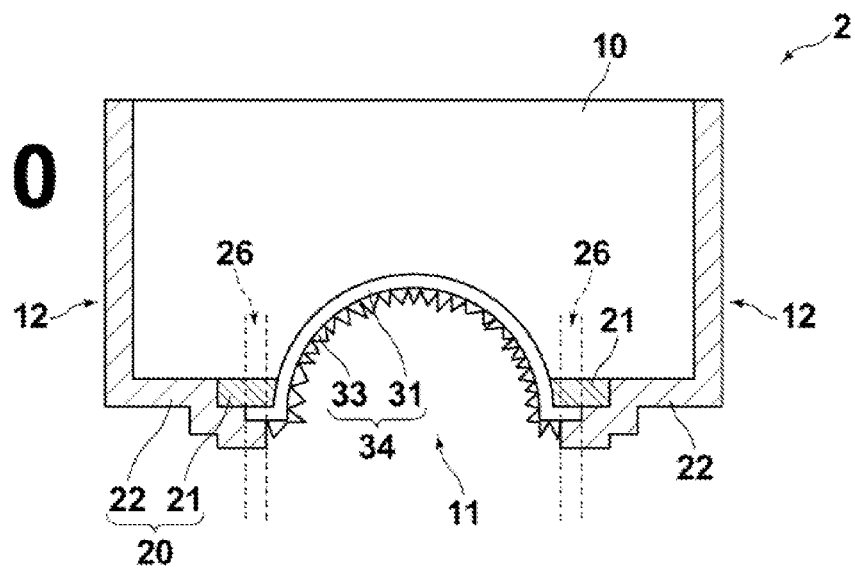

OPTICAL MEMBER AND ITS PRODUCTION METHOD

CROSS-REFERENCE TO RELATED APPLICATIONS

This application is a Continuation of PCT International Application No. PCT/JP2014/000812 filed on Feb. 18, 2014, which claims priority under 35 U.S.C. § 119(a) to Japanese Patent Application No. 2013-052646 filed on Mar. 15, 2013. Each of the above applications is hereby expressly incorporated by reference, in its entirety, into the present application.

BACKGROUND

The present disclosure relates to an optical member and its production method, and particularly to an optical member including an antireflection coating on its surface, and further including a light shield part in a part surrounding the antireflection coating and a production method of the optical member.

Conventionally, an antireflection structural member (antireflection coating) is provided on a light incident surface of a lens (transparent substrate) made of transparent material, such as glass and plastic, to reduce a loss of transmission light caused by reflection at the surface.

As an antireflection structural member for visible light, a dielectric multi-layer coating, a fine uneven pattern structural member with a pitch shorter than the wavelength of visible light and the like are known (Japanese Unexamined Patent Publication No. 2005-275372 (Patent Document 1), Japanese Unexamined Patent Publication No. 2012-073590 (Patent Document 2) and the like).

Patent Document 1 discloses an optical member including, as an antireflection structural member, a fine uneven pattern coating that contains alumina as a main component. As a method for forming a fine uneven pattern coating containing aluminum oxide as a main component, a method is known in which a coating of aluminum oxide is formed by a vacuum deposition method or a liquid phase method (sol-gel method), and after then, a plate-shaped crystal coating (fine uneven pattern coating) is obtained by causing a surface layer to become boehmite by hydrothermal treatment, such as vapor treatment or hot water immersion treatment.

Meanwhile, when an optical system is constructed by using optical members, such as a lens, a light shield coating is generally provided in a ray non-effective part of the optical member to suppress generation of unwanted light that causes flare, ghost and the like.

Patent Document 2 discloses an optical member in which at least one layer of protective coating is formed on a substrate, and a light shield coating is formed on the protective coating formed in a ray non-effective part of the optical member, and also a plate-shaped crystal coating that has an uneven pattern structure and contains aluminum oxide as a main component is formed on the protective coating formed in a ray effective part.

SUMMARY

In production of optical members including an antireflection structure that includes a plate-shaped crystal coating containing aluminum oxide as a main component and a light shield coating provided in a ray non-effective part, inventors of the present disclosure have found the following problems.

First, a plate-shaped crystal coating (fine uneven pattern coating) that contains aluminum oxide as a main component is fragile. Therefore, when application of shielding material to form a light shield coating fails, it is impossible to wipe or peel off the material (ultrasonic cleaning, chemical solution immersion and the like) in order to apply the material again.

Secondly, when an aluminum oxide coating is formed by vacuum deposition, if application of shielding material (formation of a light shield coating) is performed before vacuum deposition step, out gas from light shield coating material may be generated during vacuum deposition, and the gas may contaminate a vacuum apparatus, and a defect, such as mixture of impurities into the aluminum oxide coating, may occur.

Thirdly, solvent of a light shield coating gives bad effects to an optical thinfilm, such as an aluminum oxide coating, that will become a fine uneven pattern coating by hydrothermal treatment and a fine uneven pattern coating in some cases. Thinkable bad effects caused by the solvent are, for example, inhibiting formation of a fine uneven pattern structure, because an organic component contained in the solvent of the light shield coating dissolves into hot water, and adheres to the surface of the aluminum oxide coating again, and the like.

In view of the foregoing circumstances, the present disclosure provides a method for accurately and efficiently producing an optical member including an antireflection coating and a light shield coating and also an optical member with a little defect.

A first method for producing an optical member of the present disclosure is a method for producing an optical member in which an antireflection coating including a transparent fine uneven pattern coating that contains alumina hydrate, as a main component, is provided in an optically effective area on a surface of a transparent substrate, and in which a light shield coating is provided in an area including at least a boundary part, which is next to the optically effective area, in a non-effective area next to the optically effective area. The method performs, in the following order, a first light shied coating formation step that forms the light shield coating only in a part of an area in which the light shield coating is to be formed, a step that deposits an optical thinfilm including, as its outermost layer, a layer to be hydrothermally treated, which will become the fine uneven pattern coating by being hydrothermally treated, in an area in which the antireflection coating is to be formed, a second light shield coating formation step that forms a light shield coating in all of the area in which the light shield coating is to be formed, but the light shield coating was not formed in the first light shield coating formation step, and a step that forms the fine uneven pattern coating in the area in which the antireflection coating is to be formed by hydrothermally treating the layer to be hydrothermally treated.

A second method for producing an optical member of the present disclosure is a method for producing an optical member in which an antireflection coating including a transparent fine uneven pattern coating that contains alumina hydrate, as a main component, is provided in an optically effective area on a surface of a transparent substrate, and in which a light shield coating is provided in an area including at least a boundary part, which is next to the optically effective area, in a non-effective area next to the optically effective area. The method performs, in the following order, a first light shied coating formation step that forms the light shield coating only in a part of an area in which the light shield coating is to be formed, a step that deposits an optical thinfilm including, as its outermost layer, a layer to be hydrothermally treated, which will become the fine uneven pattern coating by being hydrothermally treated, in an area in which the antireflection coating is to be formed, a step that forms the fine uneven pattern coating in the area in which the antireflection coating is to be formed by hydrothermally treating the layer to be hydrothermally treated, and a second light shield coating formation step that forms a light shield coating in all of the area in which the light shield coating is to be formed, but the light shield coating was not formed in the first light shield coating formation step.

In the first and second methods for producing the optical member of the present disclosure, it is desirable that the light shield coating is formed in the boundary part in the non-effective area, and the boundary part being next to the optically effective area, in the first light shied coating formation step.

In the first and second methods for producing the optical member of the present disclosure, when the transparent substrate includes an uneven shape part in the non-effective area, it is desirable that the light shield coating is formed in the uneven shape part in the first light shield coating formation step.

It is desirable that the optical thinfilm is deposited by vapor deposition.

The optically effective area in which the antireflection coating has been formed may be a flat surface or a curved surface.

It is desirable that the light shield coating is formed by applying application material including at least one of titanium black, carbon black, black resist and black resin and resin binder in the first and second light shield coating formation steps.

A first optical member of the present disclosure comprises a transparent substrate, an antireflection coating including a transparent fine uneven pattern coating that contains alumina hydrate, as a main component, in an optically effective area on a surface of the transparent substrate, and a light shield coating in an area including at least a boundary part, which is next to the optically effective area, in a non-effective area next to the optically effective area. Further, the non-effective area includes a part in which the light shield coating has been formed by depositing two layers of light shield coating.

A second optical member comprises a transparent substrate, an antireflection coating including a transparent fine uneven pattern coating that contains alumina hydrate, as a main component, in an optically effective area on a surface of the transparent substrate, and a light shield coating in an area including at least a boundary part, which is next to the optically effective area, in a non-effective area next to the optically effective area. Further, the non-effective area includes a part in which the light shield coating, an optical thinfilm different from the light shield coating, and the light shield coating have been sequentially deposited one on another.

In the first and second optical members of the present disclosure, it is desirable that the aforementioned part of the non-effective area includes a part next to the optically effective area.

In the first and second optical members of the present disclosure, when the transparent substrate includes an uneven shape part in the non-effective area, it is desirable that the aforementioned part of the non-effective area includes the uneven shape part.

The optically effective area in which the antireflection coating has been formed may be a flat surface or a curved surface.

It is desirable that the light shield coating is made of material including at least one of titanium black, carbon black, black resist and black resin.

According to the first and second methods for producing the optical member of the present disclosure, the first light shield coating formation step is performed before the step of forming the optical thinfilm. Therefore, it is possible to easily perform correction, such as wiping and peeling off, during the light shield coating formation step. Meanwhile, the light shield coating formation step is divided into two steps, and the application amount to the light shield coating area formed in the first light shield coating formation step is smaller than an application amount to the entire light shield coating area. Therefore, it is possible to suppress generation of out gas during vapor deposition in the step of forming the optical thinfilm. Hence, it is possible to suppress contamination of the vacuum apparatus, and to suppress generation of defects caused by mixture of impurities into a coating formed by vacuum deposition.

Further, after formation of the optical thinfilm, or after formation of the fine uneven pattern coating, the light shield coating needs to be formed only in an area in which the light shield coating was not formed in the first light shield coating formation step. Therefore, it is possible to perform the second light shield coating formation step in a short time, and to suppress bad effects of the solvent on the optical thinfilm and the fine uneven pattern coating.

BRIEF DESCRIPTION OF THE DRAWINGS

FIG. 8 is a schematic cross section illustrating an optical member formed by using a production method in the first embodiment;

FIG. 9 is a schematic cross section illustrating a transparent substrate including a fine uneven pattern coating formed in a hydrothermal treatment step in a second embodiment;

FIG. 10 is a schematic cross section illustrating an optical member produced by using a production method in the second embodiment;

DESCRIPTION OF THE PREFERRED EMBODIMENTS

Hereafter, embodiments of the present disclosure will be described with reference to drawings.

An optical member produced by using a production method of the present disclosure is an optical member including an antireflection coating that includes a transparent fine uneven pattern coating containing alumina hydrate, as a main component, in an optically effective area on a surface of a transparent substrate and a light shield coating in an area including at least a boundary part, which is next to the optically effective area, in a non-effective area next to the optically effective area.

The shape of the transparent substrate is not particularly limited. The shape should be a flat plate, a concave lens, a convex lens and the like, which are used in an optical apparatus. Generally, a substrate composed of a curved surface having a positive or negative curvature and a flat surface in combination is used. In the following embodiments, a case using a plano-concave lens 10, which is schematically illustrated in the cross section of FIG. 1, as the transparent substrate will be described as an example. However, the transparent substrate is not limited to this example.

An optically effective area and a non-effective area in an optical member differ depending on the shape of a transparent substrate and the purpose of the optical member. In the optical member of the present disclosure, an optically effective area without an antireflection coating formed thereon and a non-effective area without a light shield coating formed thereon may be present on the surface of the transparent substrate.

Figure 2:
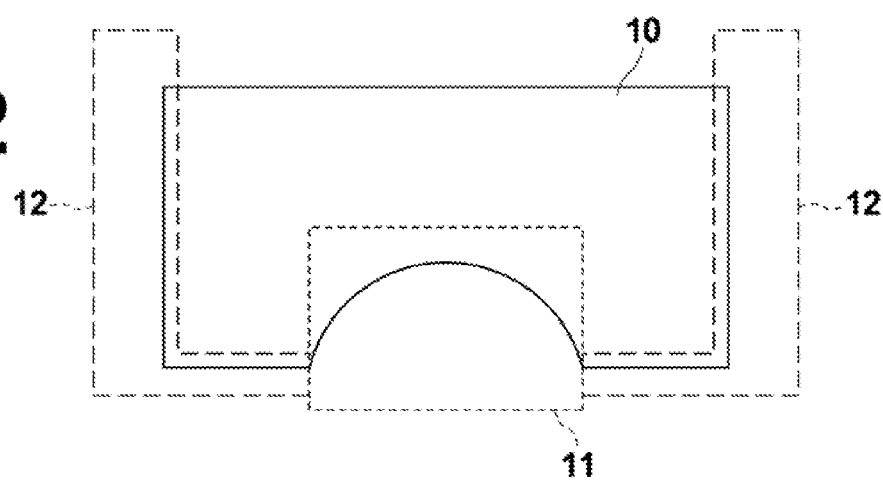
FIG. 2 is a schematic cross section illustrating an area in which an antireflection coating is to be formed and an area in which a light shield coating is to be formed on the transparent substrate.

In the following embodiments, as illustrated in FIG. 2, a concave area in the optically effective area of the plano-concave lens 10 is used as an antireflection coating formation area 11, in which an antireflection coating is formed. Further, in the non-effective area, the entire area of a flat surface part of a surface on which the concave surface is provided and the entire area of the side surface are used as a light shield coating formation area, in which a light shield coating is formed. The antireflection coating formation area 11 and the light shield coating formation area 12 should be appropriately determined based on the shape of the transparent substrate and the purpose of the optical member. A part used as an optically effective area is generally composed of a curved surface having a positive or negative curvature and a flat surface in combination. An area (light shield coating formation area 12) in which a light shield coating should be formed does not include an optically effective area, but generally includes a side surface of a lens, an edge part of a curved surface that is used as an optically effective area, and the like.

Production Method in First Embodiment

First, a first embodiment based on a first method for producing an optical member of the present disclosure will be described. FIG. 3 through FIG. 7 are schematic cross sections illustrating production process in the embodiment of the present disclosure.

Figure 3:
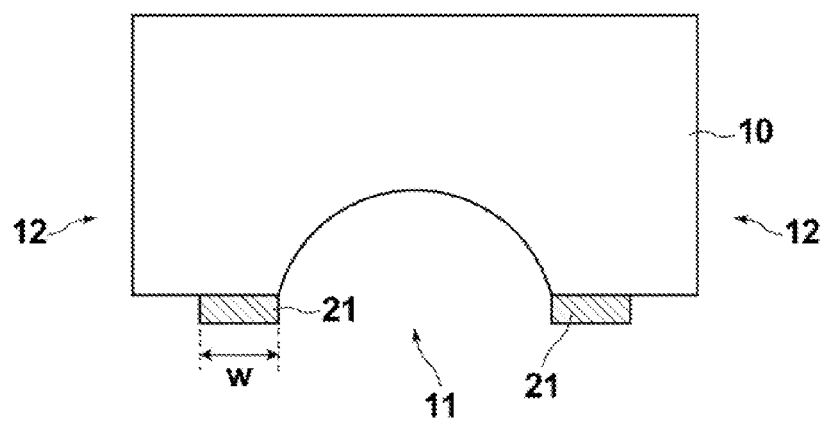
FIG. 3 is a schematic cross section illustrating a transparent substrate including a light shield coating formed in a first light shield coating forming step.

First, as a first light shield coating formation step, a light shield coating 21 is formed only in a part of the light shield coating formation area 12, as illustrated in FIG. 3.

In the first light shield coating formation step, it is desirable that the light shield coating is formed in a boundary part next to the optically effective part, and in which an error in coating especially tends to occur, and a part having a complicated uneven shape. When an error in coating occurs, wiping off for correction, ultrasonic cleaning treatment and chemical solution immersion treatment (caustic soda solution and the like) are necessitated. Since such a step gives remarkably bad effects to the optical thinfilm and the fine uneven pattern coating, the light shield coating formation process on the area in which an error in coating tends to occur is performed before formation of the optical thinfilm.

Figure 4:
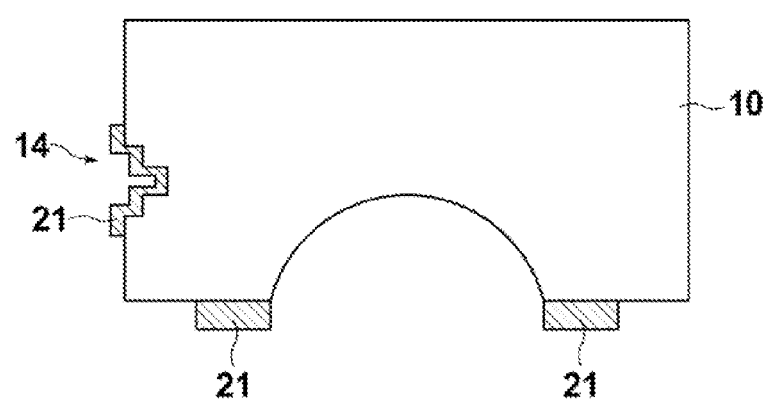
FIG. 4 is a schematic cross section illustrating another example of the transparent substrate including a light shield coating formed in the first light shield coating forming step.

FIG. 3 illustrates a state in which the light shield coating 21 is formed in a boundary part in the light shield coating formation area 12, and the boundary part being next to the antireflection coating formation area 11. Meanwhile, when a transparent substrate 10 having an uneven shape part 14 in the light shield coating formation area 12, as illustrated in FIG. 4, is used, it is desirable to form the light shield coating in this uneven shape part 14 in the first light shield coating formation step. The uneven shape part 14 provided on the transparent substrate is, for example, a mechanical portion used to mount the optical member onto an optical apparatus, and the like. Specifically, the uneven shape part 14 is a fixture groove for fixing and preventing rotation of a lens incorporated into a lens barrel, a notch for fixing an optical filter onto a turret, and the like.

In the first light shield coating formation step, it is desirable that a range in which the light shield coating is formed in the boundary part next to the optical effective area of the optical member is smaller. Here, a lower limit of the light shield coating formation area (formation width) is restricted by the position accuracy of a means for forming the light shield coating. For example, when shielding material is applied manually by a brush, the lower limit depends on the skill of an operator who applies the shielding material. When shielding material is applied mechanically by a stamper or the like, the lower limit depends on the position accuracy of the used stamper.

When a light shield coating is formed in the boundary part, a smaller formation range is better as long as the formation range is higher than or equal to the position accuracy of the formation means. It is desirable that formation width w of the light shield coating is 10 mm or less. It is more desirable that formation width w is 5 mm or less, or 2 mm or less. Further, it is desirable that the formation width w is 1 mm or less. However, when an operation is performed manually by a brush, although it depends on the skill of the individual operator, about 1 mm is the lower limit. When the light shield coating is formed by a stamper, for example, if the position accuracy of the stamper is 0.1 mm, the range of 0.1 mm may be determined as the range in which the light shield coating is formed.

The light shield coating needs to be opaque at least to light to be used. The light shield coating is made of material that does not reflect light of a wavelength or wavelengths to be used, but almost absorbs the light. Specifically, material in black color that can form an optical light shield coating is used. In a later step, hydrothermal treatment is performed. Therefore, the material in black color must be insoluble in water. For example, material including one of titanium black, carbon black, black resist and black resin and resin binder is used.

After the first light shield coating formation step, an optical thinfilm including, as its outermost layer, a layer to be hydrothermally treated, which will become the fine uneven pattern coating by being hydrothermally treated, is deposited in an area in which the antireflection coating is to be formed.

In this optical thinfilm formation step, at least one layer of optical thinfilm including, as its outermost layer, a layer to be hydrothermally treated that includes aluminum elements is formed. The number of a thinfilm layer or layers and the material and the thickness of coating are selected based on material having a refractive index and the thickness of coating achieving a more appropriate antireflection performance by a fine uneven pattern coating formed by hydrothermally treating the outermost layer.

It is known that when the refractive index of a fine uneven pattern coating and the refractive index of a substrate greatly differ from each other, the reflectance is greatly lowered by forming an optical thinfilm having a refractive index smaller than the refractive index of the substrate on the substrate. As material satisfying such conditions, an oxide, a nitride, an oxynitride and a fluoride of an element selected from silicon, titanium, zircon, zinc, magnesium and gallium are known. Material the refractive index of which is easily adjustable, and which can achieve particularly excellent performance is a silicon oxide and a silicon oxynitride. The outermost layer, which is a layer to be hydrothermally treated, includes aluminum elements to form a fine uneven pattern coating by hot water treatment. It is desirable that the outermost layer includes at least one kind of material selected from aluminum, an aluminum oxide, an aluminum oxynitride and an aluminum nitride.

As a deposition method, a batch method is adoptable, and vapor deposition is desirable to improve the productivity. For example, known vapor deposition methods, such as vacuum evaporation, plasma sputtering, electronic cyclotron sputtering and ion plating, may be used.

The formation range of the optical thinfilm is at least an area in which the antireflection coating is to be formed. The optical thinfilm may be formed also on a part or all of the light shield coating formed in the first light shield coating formation step.

Figure 5:
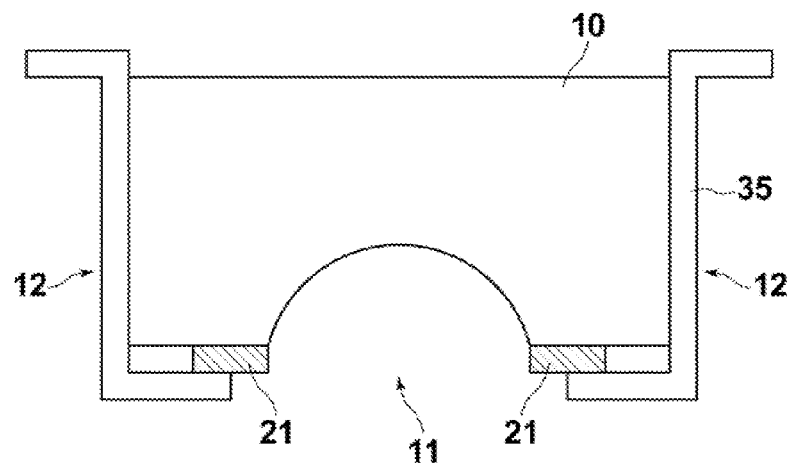
FIG. 5 is a schematic cross section illustrating a transparent substrate held in a holding part in an optical thinfilm step in a first embodiment.

When an optical thinfilm is formed by vacuum deposition, for example, as illustrated in FIG. 5, deposition is performed while the transparent substrate 10 is held by a holding part 35 for vacuum deposition in such a manner that a formation area of the optical thinfilm is exposed. The formation range of the optical thinfilm may be restricted not only by masking by the holding part, but by masking by a separate mask means.

Figure 6:
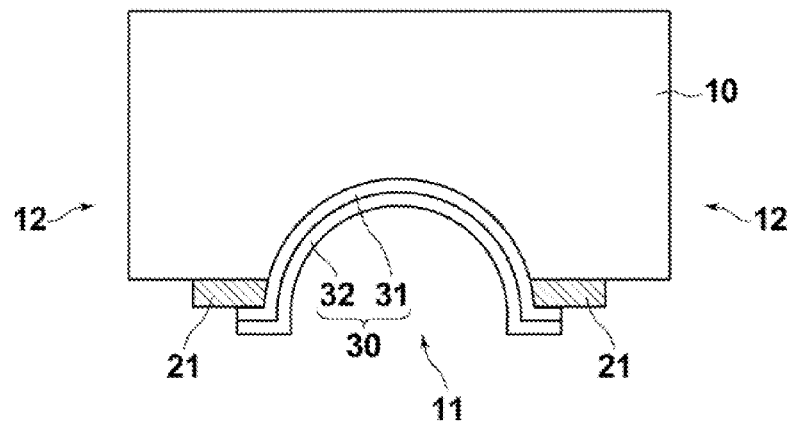
FIG. 6 is a schematic cross section illustrating the transparent substrate including an optical thinfilm formed in the optical thinfilm step in the first embodiment.

In the step of forming the optical thinfilm, for example, as schematically illustrated in FIG. 6, the optical thinfilm 30 is formed in the antireflection coating formation area 11 and a boundary part next to the antireflection coating formation area 11, and which is a part of the light shield coating 21 formed in the first light shield coating formation step. In this example, the optical thinfilm 30 is composed of two layers 31, 32, and the layer 32 to be hydrothermally treated is formed as its outer most layer.

Figure 7:
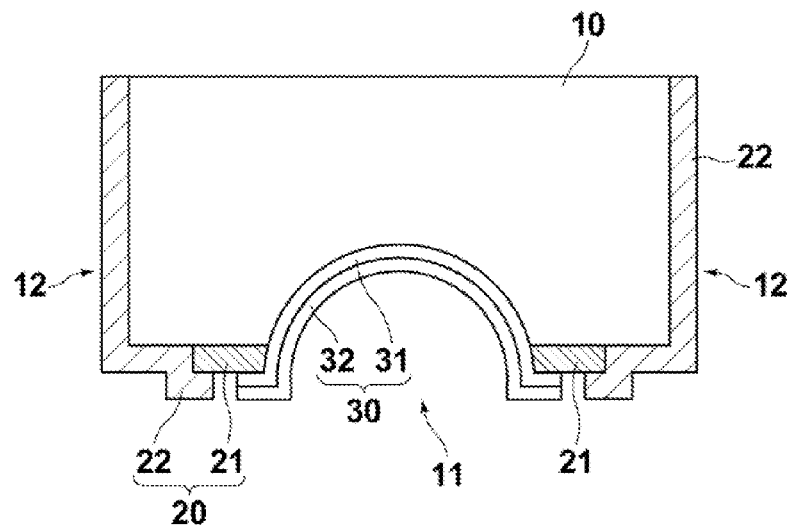
FIG. 7 is a schematic cross section illustrating a transparent substrate including a light shield coating formed in a second light shield coating formation step in the first embodiment.

Next, as a second light shield coating formation step, a light shield coating 22 is formed in all of the area 12 in which a light shield coating is to be formed but the light shield coating 21 was not formed in the first light shield coating formation step. At this time, as illustrated in FIG. 7, the light shield coating 22 may be formed again in the area in which the light shield coating 21 was formed in the first light shield coating formation step in such a manner to overlap to avoid an error of leaving a portion without formation of light shield coating. Alternatively, the light shield coating 22 may be formed on the optical thinfilm formed in the step of forming the optical thinfilm to avoid an error of leaving a portion without formation of light shield coating.

The light shield coating material used in the second light shield coating formation step is similar to the material used in the first light shield coating formation step. Generally, the same material is used in the first and second light shield coating formation steps. Alternatively, different materials may be used as long as the aforementioned materials are used.

Finally, a fine uneven pattern coating is formed by hydrothermally treating the optical thinfilm. Hydrothermal treatment, such as exposing the optical thinfilm to vapor or immersing the optical thinfilm together with the whole transparent substrate in hot water, is performed. Consequently, the layer 32 to be hydrothermally treated, which is provided as the outmost layer of the optical thinfilm 30, becomes a fine uneven pattern coating 33 containing alumina, as a main component (FIG. 8).

As described in Non-Patent Document H. Yamada and T. Okamoto, "Effects of temperature on formation and corrosion resistance of boehmite films—Studies on boehmite forming process ($6^{th}$ report)—", The Journal of Japan Institute of Light Metals, Vol. 21, No. 9, pp. 597-605, 1971, it is known that a fine uneven pattern coating is formed by immersing a coating to be hydrothermally treated containing aluminum in hot water at 60° C. or higher at 1 atmosphere for at least 1 minute. It is desirable that the coating is immersed in hot water at 70° C. or higher for at least 3 minutes, as conditions for obtaining an excellent fine uneven pattern coating. An upper limit of the immersion time is not particularly present. However, since aluminum hydroxide slightly continues to dissolve, it is desirable that the immersion time is less than or equal to 30 minutes. When the coating is exposed to vapor, it is desirable that the coating is exposed to vapor at 143° C. or higher for at least 60 minutes.

Through the aforementioned steps, an optical member 1 including an antireflection coating 34 that includes a transparent fine uneven pattern coating 33 containing alumina hydrate, as a main component, in an optically effective area on a surface of a transparent substrate 10 and light shield coatings 20 (21, 22) in a non-effective area next to the antireflection coating formation area 11 in the optically effective area, as illustrated in FIG. 8, is obtainable.

In the optical member 1 illustrated in FIG. 8, a part 25 in which the light shield coating 21 formed in the first light shield coating formation step and the light shield coating 22 formed in the second light shield coating formation step overlap is present in a part of the non-effective area. The part in which the light shield coatings 21, 22 are deposited one on the other is formed by applying the light shield coating 22 after the light shield coating 21 is fully completed after formation of the light shield coating 21 by application. Therefore, it is possible to check that the light shield coatings are deposited one on the other by observing a cross section by a scan electron microscope (SEM) or the like.

Production Method in Second Embodiment

Next, a second embodiment based on a second method for producing an optical member of the present disclosure will be described.

Also in the second embodiment, first, a partial light shield coating 21 is formed in the first light shield coating formation step. After then, an optical thinfilm 30 is deposited in an area 11 in which an antireflection coating is to be formed (please refer to FIG. 6). The optical thinfilm 30 includes a layer 32 to be hydrothermally treated, which will become a fine uneven pattern coating by hydrothermal treatment, as its outermost layer. These steps of the first light shield coating formation step through the optical thinfilm formation step are similar to those of the first embodiment.

After then, in this embodiment, hydrothermal treatment is performed on the optical thinfilm before the second light shield coating formation step. The details of hydrothermal treatment are similar to the case of the first embodiment. Accordingly, a structure including the partial light shield coating 21 on the transparent substrate 10 and the antireflection coating 34 that includes a fine uneven pattern coating 33 on a concave surface is obtainable.

After then, a second light shield coating formation step, in which a light shield coating is formed in a part of the light shield formation area 12 in which the light shield coating 21 was not formed in the first light shield coating formation step, is performed. The second light shield coating formation step may be performed almost similar to the first embodiment. Here, the second light shield coating 22 may be formed in such a manner to cover an edge of the optical thinfilm 30 including the fine uneven pattern coating 33 formed on the first light shield coating 21. Since the fine uneven pattern coating 33 is fragile at the edge of the optical thinfilm 30, the fine uneven pattern coating 33 is destroyed by pressure during application of the light shield coating 22, and only a layer 31 under the fine uneven pattern coating 33 remains.

Through the aforementioned steps, an optical member 2 including an antireflection coating 34 including a transparent fine uneven pattern coating 33 that contains alumina hydrate, as a main component, in an optically effective area on a surface of a transparent substrate 10 and light shield coatings 20 (21, 22) in a non-effective area next to the antireflection coating formation area 11 in the optically effective area, as illustrated in FIG. 10, is obtainable.

In the optical member 2 illustrated in FIG. 10, a part 26 in which the light shield coating 21, the layer 31 of the optical thinfilm 30 and the light shield coating 22 are sequentially deposited one on another from the transparent substrate 10 side is present in a part of the non-effective area.

EXAMPLES

Next, more specific methods for producing optical members of the present disclosure and the structure of the optical members produced by using the production methods will be described as examples.

Example 1

Figure 1:
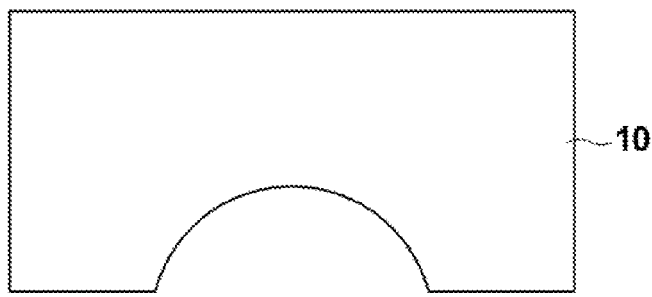
FIG. 1 is a schematic cross section of a transparent substrate.

A plano-concave lens with diameter φ of 25 mm and a thickness of 12.5 mm, which is a transparent substrate made of lanthanum glass having a concave part with curvature radius R=12 mm and a depth of 4.5 mm, was prepared (please refer to FIG. 1). In this example, an antireflection coating formation area 11, in which an antireflection coating is to be formed, is a concave part. The entire area of a flat surface part of a surface on which the concave surface is provided, and the flat surface part being present around the concave part, and the entire area of the side surface of the lens are the light shield coating formation area 12, in which the light shield coating is to be formed (please refer to FIG. 2).

First, as the first light shield coating formation step, a light shield coating 21 including carbon black and resin binder was applied to a part surrounding an optically effective area by a brush, and a light shield coating with a width of 5 mm was formed (please refer to FIG. 3). Application was performed by fixing the transparent substrate to a rotation stage by a vacuum chuck, and by slowly rotating the transparent substrate. In this example, in the first light shield coating formation step, the light shield coating 21 was formed only in a boundary part next to the optically effective area. However, since a position at which an error in coating may occur depends on the shape of a lens, the light shield coating may be formed in another position that is not illustrated in this example.

The transparent substrate 10 was held in a vacuum deposition apparatus by a holding part 35 for vacuum deposition, illustrated in FIG. 5, and a thinfilm layer 31 of silicon oxynitride of 90 nm was deposited by a reactive sputtering apparatus. After then, a thinfilm layer 32 of alumina of 40 nm was deposited. In this example, the thinfilm layer 31 of silicon oxynitride and the thinfilm layer 32 of alumina constitute the optical thinfilm 30. Here, the holding part 35 for vacuum deposition is designed to mask a part of the light shield coating 21 formed in the first light shield formation step. Accordingly, the optical thinfilm 30 is not formed in a part of the light shield coating 21. Consequently, the thinfilm layer 31 of silicon oxynitride and the thinfilm layer 32 of alumina were formed, as illustrated in FIG. 6.

Next, in the second light shield coating formation step, the light shield coating 22 was formed at least in a part of the light shield coating formation area, in which no light shield coating had been applied yet, by using a method similar to the first light shield coating formation step. At this time, the light shield coating 22 was formed in such a manner to overlap with a part of the light shield coating 21, which had been formed in the first light shield coating formation step, to avoid an error of leaving a portion without formation (please refer to FIG. 7).

Finally, the transparent substrate 10 on which the light shield coating 20 (21, 22) and the optical thinfilm 30 had been formed were immersed in hot water at 80° C. for 5 minutes. Then, the thinfilm layer 32 of alumina as the outermost layer became aluminum hydroxide, and became the fine uneven pattern coating 33 of fine plate-shaped crystals (please refer to FIG. 8). In the antireflection coating formation area 11, excellent antireflection properties were obtained on the concave surface of the plano-concave lens by optical interference between the thinfilm layer 31 of silicon oxynitride and the fine uneven pattern coating 33 of fine plate-shaped crystals.

In this Example 1, as illustrated in FIG. 8, the optical member 1 in which the antireflection coating 34 including a transparent fine uneven pattern coating 33 that contains alumina hydrate, as a main component, is provided in an optically effective area on a surface of the transparent substrate 10, and in which a light shield coating 20 (21, 22) is provided in a non-effective area next to the antireflection coating formation area 11 in the optically effective area was obtained. In the optical member 1, a part 25 in which the light shield coating 21 formed in the first light shield coating formation step and the light shield coating 22 formed in the second light shield coating formation step overlap is present in a part of the non-effective area.

Example 2

The light shield coating 21 was formed on the transparent substrate 10 in the first light shield coating formation step and further the optical thinfilm 30 was formed in a manner similar to Example 1. After then, the transparent substrate 10 on which the partial light shield coating 21 and the optical thinfilm 30 were formed was immersed in hot water at 80° C. for 5 minutes before the second light shield coating formation step. Then, the alumina thinfilm layer 32 as the outermost layer became aluminum hydroxide, and became the fine uneven pattern coating 33 of fine plate-shaped crystals (please refer to FIG. 9).

After then, in the second light shield coating formation step, the light shield coating 22 was formed at least in a part of the light shield coating formation area 12, in which no light shield coating 21 had been applied yet, by using a method similar to the first light shield coating formation step. At this time, the light shield coating 22 was formed in such a manner that the light shield coating 22 overlaps with a part of the light shield coating 21, which had been formed in the first light shield coating formation step, to avoid an error of leaving a portion without formation.

In this Example 2, as illustrated in FIG. 8 in a manner similar to Example 1, the optical member 1 in which the antireflection coating 34 including a transparent fine uneven pattern coating 33 that contains alumina hydrate, as a main component, is provided in an optically effective area on a surface of the transparent substrate 10, and in which a light shield coating 20 (21, 22) is provided in a non-effective area next to the antireflection coating formation area 11 in the optically effective area was obtained. In the optical member 1, a part 25 in which the light shield coating 21 formed in the first light shield coating formation step and the light shield coating 22 formed in the second light shield coating formation step overlap is present in a part of the non-effective area.

Example 3

The light shield coating 21 was formed on the transparent substrate 10 in the first light shield coating formation step and further the optical thinfilm 30 was formed in a manner similar to Example 1. At this time, the optical thinfilm 30 was formed on the entire surface of the light shield coating 21. Then, the second light shield coating formation step was performed like the case of Example 1. At this time, the light shield coating 22 was formed in such a manner that the light shield coating 22 overlaps with a part of the thinfilm layer 31 of silicon oxynitride and the thinfilm layer 32 of alumina, which had been formed on the light shield coating 21, to avoid an error of leaving a portion without formation of light shield coating. Consequently, as illustrated in FIG. 11, a part 27 in which the light shield coating 21, the optical thinfilm 30 (the thinfilm layer 31 of silicon oxynitride and the thinfilm layer 32 of alumina) and the light shield coating 22 are sequentially deposited one on another from the transparent substrate 10 side was formed in a part of the non-effective area next to the optically effective area.

Figure 11:
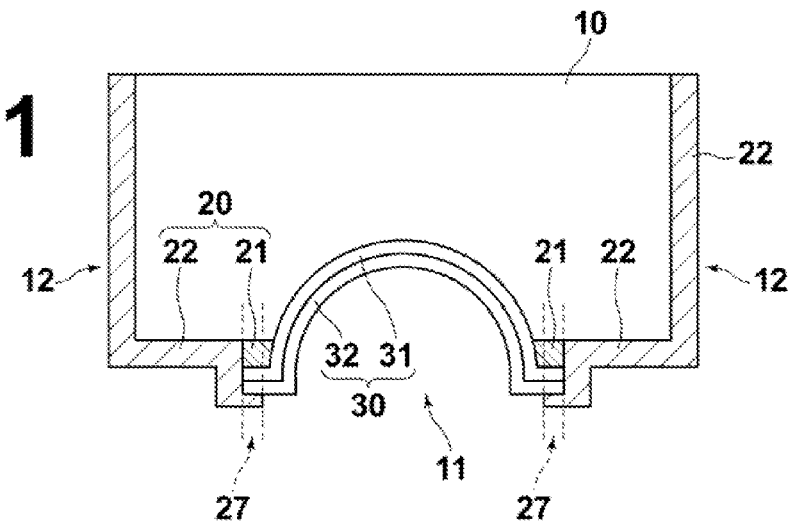
FIG. 11 is a schematic cross section illustrating a transparent substrate including a light shield coating formed in a second light shield coating formation step in Example 3.

Finally, the transparent substrate 10 illustrated in FIG. 11 was immersed in hot water at 80° C. for 5 minutes. Then, the alumina thinfilm layer 32 as the outermost layer of the optical thinfilm 30 became aluminum hydroxide, and formed the fine uneven pattern coating 33 of fine plate-shaped crystals (please refer to FIG. 12). In the optically effective area, excellent antireflection properties were obtained also at this time in a manner similar to Example 1.

Figure 12:
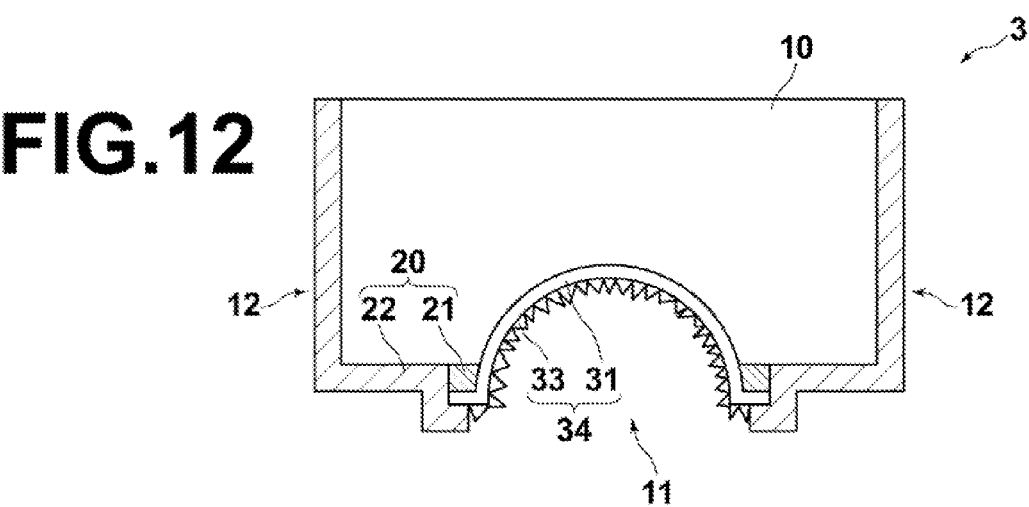
FIG. 12 is a schematic cross section illustrating an optical member produced by using a production method in Example 3.

In this Example 3, as illustrated in FIG. 12, the optical member 3 in which the antireflection coating 34 including a transparent fine uneven pattern coating 33 that contains alumina hydrate, as a main component, is provided in an optically effective area on a surface of the transparent substrate 10, and in which a light shield coating 20 (21, 22) is provided in a non-effective area next to the antireflection coating formation area 11 in the optically effective area was obtained. In the optical member 3, a part 27 in which the light shield coating 21 formed in the first light shield coating formation step, the optical thinfilm 30 and the light shield coating 22 formed in the second light shield coating formation step are deposited one on another is present in a part of the non-effective area.

Example 4

The light shield coating 21 was formed on the transparent substrate 10 in the first light shield coating formation step and further the optical thinfilm 30 was formed in a manner similar to Example 1. After then, the transparent substrate 10 on which the partial light shield coating 21 and the optical thinfilm 30 were formed was immersed in hot water at 80° C. for 5 minutes before the second light shield coating formation step. Then, the alumina thinfilm layer 32 as the outermost layer became aluminum hydroxide, and became the fine uneven pattern coating 33 of fine plate-shaped crystals (please refer to FIG. 9).

Finally, in the second light shield coating formation step, the light shield coating 22 was formed at least in a part of the light shield coating formation area 12, in which no light shield coating 21 had been formed in the first light shield formation step, by using a method similar to the first light shield coating formation step. At this time, the light shield coating 22 was formed in such a manner that the light shield coating 22 overlaps with a part of the the thinfilm layer 31 of silicon oxynitride and the fine uneven pattern coating 33 of fine plate-shaped crystals, which had been formed on the light shield coating 21, to avoid an error of leaving a portion without formation of light shield coating. In this case, the fine uneven pattern coating 33 of fine plate-shaped crystals of aluminum hydroxide was destroyed by pressure during application of the light shield coating 22, and a part 26 as illustrated in FIG. 10 was formed in a part of the non-effective area next to the optically effective area. In the part 26, the light shield coating 21, the thinfilm layer 31 of silicon oxynitride and the light shield coating 22 are deposited one on another from the transparent substrate 10 side. The layer 31, which is an optical thinfilm different from the light shield coatings 21, 22, is deposited between the light shield coatings 21, 22 in the part 26. In the optically effective area, excellent antireflection properties were obtained also at this time in a manner similar to Example 1.

In this Example 4, as illustrated in FIG. 10, the optical member 2 in which the antireflection coating 34 including a transparent fine uneven pattern coating 33 that contains alumina hydrate, as a main component, is provided in an optically effective area on a surface of the transparent substrate 10, and in which a light shield coating 20 (21, 22) is provided in a non-effective area next to the antireflection coating formation area 11 in the optically effective area was obtained, and a part 26 is present in a part of the non-effective area. In the part 26, the light shield coating 21 formed in the first light shield coating formation step, a layer 31 of the optical thinfilm 30 and the light shield coating 22 formed in the second light shield formation step are deposited one on another.

What is claimed is:

1. A method for producing an optical member in which an antireflection coating including a transparent fine uneven pattern coating that contains alumina hydrate, as a main component, is provided in an optically effective area on a surface of a transparent substrate, and in which a light shield coating is provided in an area including at least a boundary part, which is next to the optically effective area, in a non-effective area next to the optically effective area, the method performing in the following order:

a first light shield coating formation step that forms a first layer of the light shield coating only in a part of an area in which the light shield coating is to be formed;

a step that deposits an optical thinfilm including, as its outermost layer, a layer to be hydrothermally treated, which will become the fine uneven pattern coating by being hydrothermally treated, in an area in which the antireflection coating is to be formed;

a second light shield coating formation step that forms a second layer of the light shield coating at least in all parts of the area in which the light shield coating is to be formed, where the first layer is not formed; and a step that forms the fine uneven pattern coating in the area in which the antireflection coating is to be formed by hydrothermally treating the layer to be hydrothermally treated.

2. A method for producing an optical member in which an antireflection coating including a transparent fine uneven pattern coating that contains alumina hydrate, as a main component, is provided in an optically effective area on a surface of a transparent substrate, and in which a light shield coating is provided in an area including at least a boundary part, which is next to the optically effective area, in a non-effective area next to the optically effective area, the method performing in the following order:

a first light shield coating formation step that forms a first layer of the light shield coating only in a part of an area in which the light shield coating is to be formed;

a step that deposits an optical thinfilm including, as its outermost layer, a layer to be hydrothermally treated, which will become the fine uneven pattern coating by being hydrothermally treated, in an area in which the antireflection coating is to be formed;

a step that forms the fine uneven pattern coating in the area in which the antireflection coating is to be formed by hydrothermally treating the layer to be hydrothermally treated; and a second light shield coating formation step that forms a second layer of the light shield coating at least in all parts of the area in which the light shield coating is to be formed, where the first layer is not formed.

3. The method for producing the optical member, as defined in claim 1, wherein the first layer of the light shield coating is formed in the boundary part in the non-effective area in the first light shield coating formation step.

4. The method for producing the optical member, as defined in claim 1, wherein the transparent substrate includes an uneven shape part in the non-effective area, and wherein the first layer of the light shield coating is formed in the uneven shape part in the first light shield coating formation step.

5. The method for producing the optical member, as defined in claim 1, wherein the optical thinfilm is deposited by vapor deposition.

6. The method for producing the optical member, as defined in claim 1, wherein the optically effective area in which the antireflection coating has been formed is curved.

7. The method for producing the optical member, as defined in claim 1, wherein the light, shield coating is formed by applying application material including at least one of titanium black, carbon black, black resist and black resin and resin binder in the first and second light shield coating formation steps.

8. The method for producing the optical member, as defined in claim 2, wherein the first layer of the light shield coating is formed in the boundary part in the non-effective area in the first light shield coating formation step.

9. The method for producing the optical member, as defined in claim 2, wherein the transparent substrate includes an uneven shape part in the non-effective area, and wherein the first layer of the light shield coating is formed in the uneven shape part in the first light shield coating formation step.

10. The method for producing the optical member, as defined in claim 2, wherein the optical thinfilm is deposited by vapor deposition.

11. The method for producing the optical member, as defined in claim 2, wherein the optically effective area in which the antireflection coating has been formed is curved.

12. The method for producing the optical member, as defined in claim 2, wherein the light shield coating is formed by applying application material including at least one of titanium black, carbon black, black resist and black resin and resin binder in the first and second light shield coating formation steps.

* * * * *